United States Patent [19]

Gedl et al.

[11] Patent Number: 4,745,493
[45] Date of Patent: May 17, 1988

[54] CIRCUIT ARRANGEMENT FOR A COLOR IMAGE RECORDING AND REPRODUCTION INSTRUMENT OR A COLOR TELEVISION RECEIVER

[75] Inventors: Karl Gedl, St. Pölten, Austria; Jörg Wölber, Pinneberg, Fed. Rep. of Germany

[73] Assignee: U.S. Philips Corporation, New York, N.Y.

[21] Appl. No.: 887,152

[22] Filed: Jul. 17, 1986

[30] Foreign Application Priority Data

Jul. 17, 1985 [DE] Fed. Rep. of Germany ....... 3525492

[51] Int. Cl.⁴ .......................... H04N 9/80; H04N 9/66
[52] U.S. Cl. ....................................... 358/324; 358/24
[58] Field of Search ............... 358/316, 320, 324, 326, 358/328, 330, 24, 25

[56] References Cited

U.S. PATENT DOCUMENTS

| | | | |
|---|---|---|---|
| 3,996,605 | 12/1976 | Coffey | 358/329 |
| 4,376,291 | 3/1983 | Heitmann | 358/320 |
| 4,477,839 | 10/1984 | Sugiyama | 358/326 |
| 4,480,265 | 10/1984 | Spiero | 358/328 |
| 4,555,734 | 11/1985 | Fukui | 358/320 |
| 4,636,836 | 1/1987 | Steckler et al. | 358/25 |
| 4,644,388 | 2/1987 | Douziech et al. | 358/24 |

*Primary Examiner*—Donald McElheny, Jr.
*Attorney, Agent, or Firm*—William J. Streeter; Gregory P. Gadson

[57] ABSTRACT

A circuit arrangement for a color image recording and reproduction instrument(video recorder) or a color television receiver. Such devices have a phase regulation circuit in which an oscillator (18, 59) is controlled in accordance with the phase comparison between the color synchronization signal and a reference signal performed in a phase comparator circuit (9, 40). A control signal from the phase comparator circuit is applied to at least two scanning and locking units (12, 13; 49 to 52) which can be changed over successively and cyclically. These units scan the control signal during the color synchronization blanking time. The output signals of the scanning and locking units (12, 13; 49 to 52) are applied to an adder (16, 54) coupled to the oscillator (18, 59). The interference signals arising from the PAL changeover and superimposed on the control signal are thus eliminated.

4 Claims, 2 Drawing Sheets

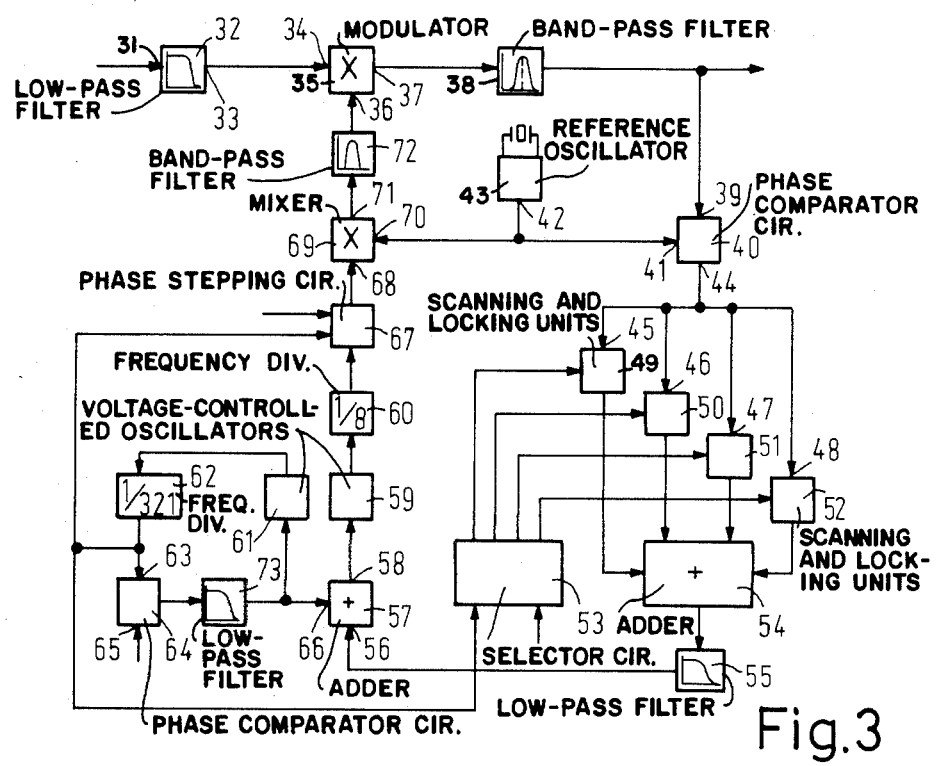
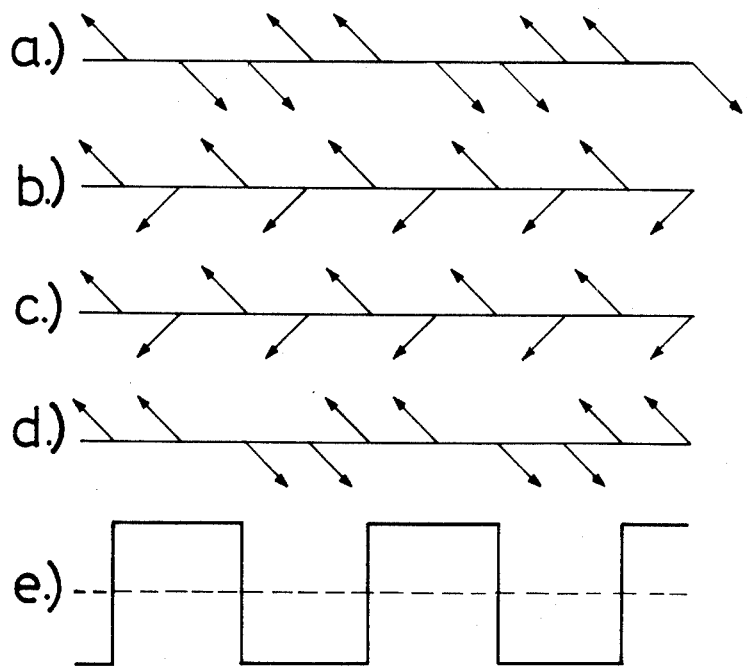
Fig.3
Fig.4

4,745,493

CIRCUIT ARRANGEMENT FOR A COLOR IMAGE RECORDING AND REPRODUCTION INSTRUMENT OR A COLOR TELEVISION RECEIVER

BACKGROUND OF THE INVENTION

The invention relates to a circuit arrangement for a color image recording and reproduction instrument (video recorder) or a colour television receiver with a phase regulation circuit which includes a phase comparator circuit and a voltage-controlled oscillator, where the phase regulation circuit comprises a first input to receive a color synchronization signal and a second input for receiving a signal derived from the oscillator and an output, the output of the phase comparator circuit being coupled to a control input of the oscillator and the oscillator output being coupled to the second input of the phase comparator circuit.

Such a circuit arrangement is known from the book by Limann/Pelka, "Fernsehtechnik ohne Ballast" ("Television technology without a ballast"), Franzis-Verlag, Munich, 14th edition, 1983, pp. 332 to 342, especially FIG. 16.11, with reference to television receivers. The output signal of the voltage-controlled oscillator required for the synchronous demodulation of the square amplitude modulated color difference signals is synchronized with the color synchronization signal in the phase regulation circuit. In PAL systems, the phase of the color synchronization signal alters by 90° from line so that to line the control signal of the phase comparator circuit also changes at half the line frequency. To ensure that only the mean of the alternating signal of the phase comparator circuit affects the voltage-controlled oscillator, a low-pass filter is connected behind the phase comparator circuit. It has a long time constant so that the alternating signal produced by the alternating phase of the color synchronization signal is properly suppressed. This does mean, however, that changes in regulation are only compensated slowly.

In current video recorder systems during recording the band-limited brightness signal is frequency-modulated in a higher frequency range and the the color type signal is amplitude-modulated in a lower frequency range. At the same time, the color type signals of certain lines of a half-image are phase-shifted by a constant amount. During playback this phase shift is again cancelled on frequency conversion and thus, the phase of the components of the crosstalk interference brought about by the side tracks is changed. The crosstalk interference is suppressed in a peak filter. The output of the peak filter is connected to the input of the phase regulation circuit with the aid of which a carrier for the modulation is generated.

In a VHS system of the PAL or NTSC standard, the distance between the neighboring tracks is reduced when changing the tape from four to six or eight hours play. During playback of a four-hour tape, the crosstalk from neighboring tracks is so small that the input of the phase regulation circuit may be connected in front of the peak filter. This increases the rate of regulation of the phase regulation circuit. Without the use of the peak filter, there is considerable crosstalk on the playback of a six or eight-hour tape since the tracks are closer together than on a four-hour tape. Owing to the phase-shift during the frequency change in the control signal of the phase comparator circuit, this crosstalk interference occurs at a constant frequency which is lower than the line frequency, and is in a whole-number ratio to it. Besides the above interference through the PAL changeover in a PAL-VHS system, there is interference in the control signal of the phase comparator circuit caused by the phase shift of a quarter of the line frequency. In a VHS system of the NTSC standard, interference caused by the phase shift occurs in the phase comparator circuit control signal at half the line frequency.

SUMMARY OF THE INVENTION

It is the aim of the invention to provide a circuit arrangement of the type described supra in such a way that the interference occurring in the phase regulation circuit at a frequency of a fraction of the line frequency is eliminated, while the regulation is rapid.

This aim is achieved by the invention in that the output of the phase comparator circuit is connected via at least one first and one second scanning and locking unit to the first and second inputs of an adder, the output of which is connected to the control input of the oscillator, and in that the scanning and locking units are arranged to scan the phase comparator circuit output signal successively by alternate lines during the color synchronization blanking periods.

In the circuit arrangement of the invention, only one scanning and locking unit is in the scanning mode during the color synchronization blanking time (i.e. the time during which the color synchronization signal appears). The other scanning and locking units store the last value scanned. The interference components are mutually superimposed in the adder so that they are eliminated by averaging. Two scanning and locking units are needed to remove the interference brought about by the PAL changeover and occurring at half the line frequency. The number of scanning units for crosstalk compensation depends on the frequency at which this interference is superimposed upon the phase comparator circuit control signal. This frequency corresponds to the line frequency divided by a whole-number divisor. The number of scanning and locking units is equal to this divisor.

It should also be pointed out that a circuit arrangement is known from German patent specification No. 31 14 198 in which a first scanning and locking unit serves to lock the phase errors occurring in first alternating lines, and a second unit serves to lock the errors occurring in second alternating lines. These phase errors may be generated in a video camera before recording in a video instrument, and are errors in the phase relationship of successive color synchronization signals. The output signals of these two scanning and locking units pass through filters to an integrating amplifier which generates a phase error correction signal. In the known circuit arrangement the outputs of the scanning and locking units are not coupled to an adder and the interference signal produced by the PAL change over is eliminated by another circuit.

Another circuit arrangement is known from German published specification No. 26 46 737, in which two successively and cyclically switched scanning and locking units are coupled between the phase comparator circuit and the voltage-controlled oscillator. Here, however, a scanning and locking unit is scanned only during the occurrence of the color synchronization signals, whereas the other is scanned only during the flyback period, excluding the duration of the color synchronization signals. This prevents any drift in the tuning voltage of the voltage-controlled oscillator.

In a first embodiment of the invention, a television receiver of the PAL standard comprises a PAL decoder to obtain the color difference signals with a first input to receive a first colour type signal and a second coupled to the output of the oscillator, and with two scanning and locking units being inserted behind the phase comparator circuit. In a television receiver, the signal components occurring due to the alternating phase of the color synchronization signal at the output of the phase comparator circuit at half line frequency, to the same extent but of different sign, must be eliminated by averaging.

In a second embodiment of the invention there is, for a video recorder, a color type signal from a first carrier modulated by a modulator to a second carrier, and frequency converted by means of a third carrier, the modulator having a first input to receive the color type signal, a second input to receive the third carrier and an output which is coupled to the first input of the phase comparator circuit, a phase stepping circuit being inserted behind the voltage-controlled oscillator to restore the original phase relationship of the second carrier and to eliminate the phase shift made on recording at the first carrier, and there is a mixer to generate the third carrier, with a first and a second input coupled to an output of the phase stepping circuit or a reference oscillator. On playback, the phase shift in the color type signals, which are shifted during recording during certain lines of a half-image by a constant amount, is once more eliminated by the fact that the third carrier is changed in phase during certain lines with the aid of the phase stepping circuit. The crosstalk components of the color synchronization signals phase-shifted by this phase stepping circuit are removed with the aid of the scanning and locking units.

If, in video recorder of the PAL standard, the crosstalk components and the components in the output signal of the phase comparator circuit produced by the PAL changeover are to be removed, at least four scanning and locking units must be inserted behind the phase comparator circuit.

BRIEF DESCRIPTION OF THE DRAWINGS

Some embodiments of the invention will now be described with reference to the drawings. They show:

FIG. 3 shows a second embodiment of the invention as part of a video recorder circuit, and FIG. 4 shows (a)-(e) graphs to explain the invention of FIG. 3.

DETAILED DESCRIPTION OF THE INVENTION

Figure 1:
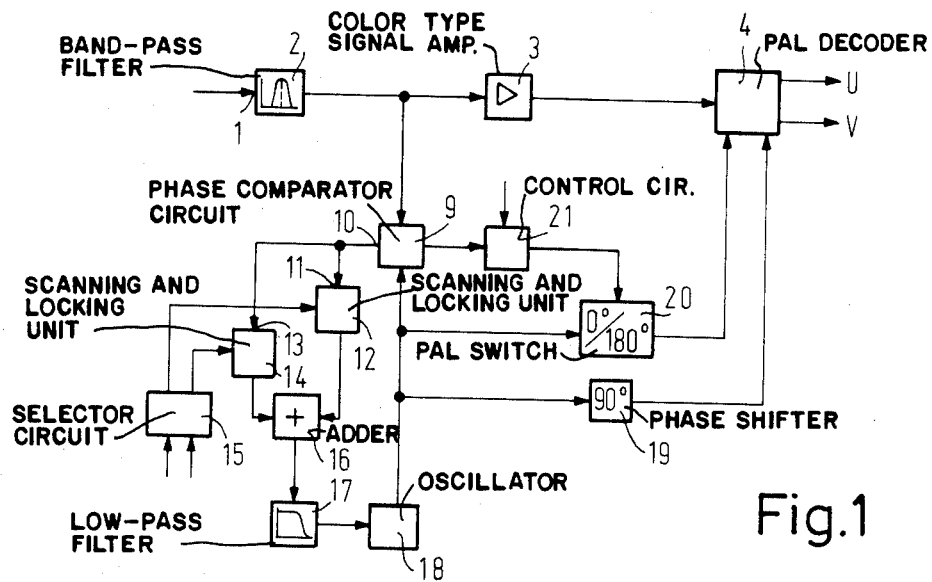
FIG. 1 shows a first embodiment of the invention as part of a television receiver circuit.

In FIG. 1, a composite color video signal of the PAL standard is applied to an input 1 of a band-pass filter 2 with a mean frequency of 4.43 MHz. In the television receiver, the FBAS signal has previously gone through the usual signal stages like the tuner, image intermediate frequency filter and demodulator (not shown in greater detail). The output signal from band-pass filter 2, the color type signal, is applied to a color type signal amplifier 3. Behind color type signal amplifier 3 is inserted a PAL decoder 4, at the outputs of which appear the color difference signals U and V.

The output signal of band-pass filter 2 is also applied to a phase comparator circuit 9, an output 10 of which is connected on one side to input 11 of a first scanning and locking unit 12 and on the other to input 13 of a second scanning and locking unit 14. Both scanning and locking units 12 and 14 are controlled by a selector circuit 15 which contains line-frequency and the color synchronization blanking pulses, so that only one scanning and locking unit is in the scanning state during the color synchronization blanking time. During this period, scanning and locking unit 12, for example, scans the output signal of phase comparator circuit 9 and unit 14 stores the latest signal scanned. During the following color synchronization blanking period, scanning and locking unit 14 is in the scanning state and unit 12 in the locking state. The cycle begins anew during the next color synchronization blanking period.

The output signals of scanning and locking units 12 and 14 are superimposed in an adder 16 and sent via an interference-suppressing low-pass filter 17 as a control signal to an oscillator 18, which generates an auxiliary color carrier signal at 4.43 MHz. The output signal of oscillator 18 is applied to phase comparator circuit 9. The phase regulation circuit made up of phase comparator circuit 9, the two scanning and locking units 12 and 14, adder 16, low-pass filter 17 and oscillator 18 serve to synchronize the color synchronization signals with the auxiliary color carrier signal generated in oscillator 18. Filter 17 has a high limiting frequency and hence a low time constant, making for fast regulation. The output signal of oscillator 18 is also applied to PAL decoder 4 via a 90° phase-shifter 19 and a PAL switch 20. As is known, the purpose of phase-shifter 19 is to generate an auxiliary color carrier signal shifted by 90° and essential to square demodulation, and that of PAL switch 20 is to take account of the PAL changeover through 180° alternating from line to line. PAL switch 20 is controlled by control circuit 21 to which a line-frequency signal and also a half-line frequency characteristic pulse generated in phase comparator circuit 9 is sent.

Figure 2:
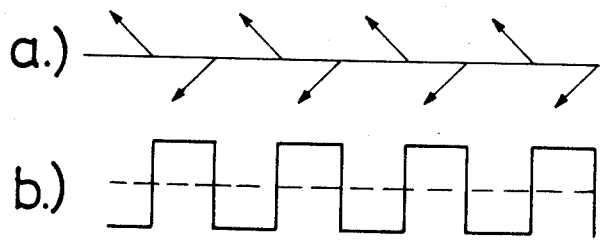
FIG. 2 shows (a) and (b) graphs to explain the invention of FIG. 1.

In a PAL coded television signal, the phase of the color synchronization signal alternates through 90° from line to line. In the color circuit, the color synchronization signals are at 135° and 225° in relation to the color difference signal U. Graph a of FIG. 2 shows the position of the color synchronization signals in the color circuit for a few lines (in front of phase comparator circuit 9). At output 10 of phase comparator circuit 9, after phase comparison, there is a control signal depending on the phase difference between the color synchronization signal and the auxiliary color carrier signal generated in oscillator 18. As the color synchronization signal alternates from line to line (in front of phase comparator circuit 9), a signal at half line frequency is superimposed on the control signal governed by the phase difference. This signal occurring at half line frequency is shown in graph b of FIG. 2. As the existing and the output signal delayed by one line from the phase comparator circuit are superimposed in adder 16, the signal occurring at half line frequency is averaged. Thus, the auxiliary color carrier signal can very quickly be synchronized with the color synchronization signal, since there is a delay of only one line.

A second embodiment, concerning a circuit arrangement for a video recorded to VHS-PAL standard is shown in FIG. 3. A PAL coded video signal is applied via the video heads to input 31 of a low-pass filter 32 with a limiting frequency of 1.1 MHz. A colour type signal free from the brightness signal is present at output 33 of low-pass filter 32, said outputs being connected to an input 34 of a modulator 35. In modulator 35, the color type signal from a first carrier with a frequency of 627 kHz is modulated on a second carrier with a frequency of 4.43 MHz. For the purposes of this conversion process, a third carrier of 5.06 MHz is taken to a second input 36 of modulator 35. The modulation product at output 37 of modulator 35 contains the color type signal lying about the carrier with a frequency of 4.43 MHz and a higher-frequency signal component which is suppressed in downstream band-pass filter 38 with a mean frequency of 4.43 MHz. The output signal of band-pass filter 38, which is also the output signal of the circuit arrangement, is taken to an input 39 of a phase comparator circuit 40. Another input 41 of phase comparator circuit 40 is connected to an output 42 of a reference oscillator 43, which generates a quartz-stable oscillator signal at the frequency of 4.43 MHz.

Output 44 of phase comparator circuit 40 is connected to input 45 of a scanning and locking unit 49, input 46 of a scanning and locking unit 50, input 47 of a scanning and locking unit 51 and input 48 of a scanning and locking unit 52. The four units are controlled by a selector circuit 53 which receives the color synchronization pulse and a line-frequency pulse. Only one scanning and locking unit is in the scanning state during the color synchronization blanking period, while the other three are in the locking state. Thus, for example, during a first color synchronization blanking period, scanning and locking unit 49 is in the scanning state and the other three are in the locking state. During the next period, unit 50 is scanning and the other locking. During the next, unit 51 is scanning, and in the subsequent one unit 52 is in the scanning state. The scanning cycle then begins again with unit 49.

The output signals of the four scanning and locking units 49 to 52 are superimposed in an adder 54 and sent via a low-pass filter 55 with a high limiting frequency to a first input 56 of an adder 57. Output 58 of adder 57 is connected to a first voltage-controlled oscillator 59, which is an RC oscillator with a freewheeling frequency of about 5.016 MHz applied to a frequency divider 60 with a divisor of 8.

A second voltage-controlled RC oscillator 61 generates an oscillator signal with a freewheeling frequency of about 5.016 MHz. The oscillator signal is applied via a frequency divider 62 to a first input 63 of a phase comparator circuit 64. In addition, the line-frequency output signal of frequency divider 62 is taken to selector circuit 53. Frequency divider 62 has a divisor of 321, i.e., it divides the frequency of the signal from oscillator 61 by 321. The line synchronism pulses separated from the reproduced video signal are applied to a second input 65 of phase comparator circuit 64, where they are compared in frequency and phase with the frequency-divided signal from oscillator 61. The output signal of phase comparator circuit 64 is applied on the one hand to input 66 of adder 57 and on the other to the second voltage-controlled oscillator 61, via a low-pass filter 73 for interference suppression.

The output signal of frequency divider 60 is sent to a phase stepping circuit 67, to which is also sent the line-frequency output signal of frequency divider 62 and the head characteristic pulses. The latter indicate the alternation between the video heads. Phase stepping circuit 67 is described in greater detail in, for instance, German published specification No. 26 46 806. In it, the phase of the output signal of frequency divider 60 is changed by a constant amount during a line. Thus, for example, the phase is shifted by 90° from line to line during a half-image, so that the same phase shift occurs every fourth line and the phase stays the same during the next half-image.

The frequency divided and partly phase-shifted output signal of phase stepping circuit 67 with a frequency of 627 kHz is applied to a first input 68 of a mixer 69. A second input 70 of the mixer is connected to output 42 of reference oscillator 43. At output 71 of mixer 69 there is a mixing signal with both frequency componentss of 5.06 and 3.8 MHz. This mixing signal is applied via a band-pass filter 72, which suppresses the low-frequency signal component, to input 36 of modulator 35 as the third carrier.

The operation of the circuit arrangement of the invention will now be explained. The second voltage-controlled oscillator 61 is precisely set to 321 times the line frequency. Owing to component scatter, the first voltage-controlled oscillator 59 has a frequency differing only slightly from that of the second 61. The control voltage from phase comparator circuit 64 takes the first voltage-controlled oscillator 59 close to the frequency of the second 61. The frequency and phase of the first 59 are finally established by the control signal supplied to input 56 of adder 57. After frequency division in divider 60 and a possible phase shift in phase stepping circuit 67, the 627 kHz signal is generated from the output signal of voltage-controlled oscillator 59.

The purpose of the phase regulating circuit 64, formed by voltage-controlled oscillator 61, frequency divider 62, phase comparator circuit 64 and low-pass filter 73, is, as is known, to eliminate changes in speed which become perceptible as frequency changes. These frequency changes are present simultaneously in the color synchronization signal and line synchronization pulse, so that, on mixing, they cancel each other out.

During recording, the phase is shifted by 90° during the first half-image from line to line and left unchanged during the second. On playback, this phase shift is eliminated. Since only the output signal of phase comparator circuit 40 is stored in scanning and locking circuits 49 to 52 during the color synchronization signal blanking period, only the positions of the latter signal in the color circuit will be considered for consecutive lines. Graph a of FIG. 4 shows the color synchronization signal stepped during recording and applied to input 34 of modulator 35. Graph b of FIG. 4 shows the color synchronization signals of a neighboring track which are not stepped during recording, and are now superimposed on the useful signal due to crosstalk. Graph c of FIG. 4 shows the color synchronization signals of the main track taken after modulation to input 39 of phase comparator circuit 40. Graph d of FIG. 4 shows crosstalk interference stepped on modulation and superimposed on the useful signal. Besides the actual control signal, there are at output 44 of phase comparator circuit 40, a signal produced by the PAL changeover at half line frequency and one produced by the crosstalk interference at a quarter of the line frequency. This latter signal is shown on graph e of FIG. 4. As the interference signal stemming from crosstalk is periodically repeated after four lines, it is eliminated in adder 54 downstream of the four scanning and locking units 49 to 52. As is known from the circuit arrangement of FIG. 1, the half-line frequency interference signal caused by PAL changeover is also cancelled out. The control signal taken to adder 57 via low-pass filter 55 now contains only information on the phase shift.

The circuit arrangement described above for a video recorder may, for instance, be used for the operation of a 6 or 8-hour tape, since considerable crosstalk interference occurs therein. There is only slight crosstalk in the playback of a 4-hour tape. Control circuit 53 may be so arranged that, on the playback of a 4-hour tape, two scanning and locking units may be switched off, and thus the regulation rate increased. An interference signal caused by PAL changeover is superimposed on the control signal of the phase comparator circuit, but this is suppressed by the two scanning and locking units remaining on-line.

In an NTSC video recorder on the VHS system, the crosstalk interference superimposed on the color synchronization signal is removed with two scanning and locking units, since it occurs from line to line at half line frequency, and since there is no changeover of the color synchronization signal.

The circuit arrangement of the invention may also be used in a PAL video recorder set to "record" mode. Here, as in the circuit arrangement for a television receiver shown in FIG. 1, the half-line-frequency interference caused by the PAL changeover is eliminated.

What is claimed is:

1. A demodulation circuit arrangement for a color image recording and reproduction instrument (video recorder) or a color television receiver having a phase regulation circuit, wherein interference occurring in the phase regulation circuit at a frequency a fraction of the line frequency is eliminated during rapid phase regulation, said phase regulation circuit comprising: a phase comparator circuit; a voltage-controlled oscillator wherein the phase comparator circuit comprises a first input to receive a color synchronization signal and a second input for receiving a signal derived from the oscillator, and an output, the output of the phase comparator circuit being coupled to a control input of the oscillator and the oscillator output being coupled to the second input of the phase comparator circuit; at least two scanning and locking units coupled at their inputs to the output of the phase comparator circuit; and an adder having first and second inputs coupled to the outputs of the scanning and locking units, the output of the adder being coupled to the control input of the oscillator, and the scanning and locking units are arranged to scan the phase comparator circuit output signal successively by alternate lines during the color synchronization blanking periods, such that at any given moment only one scanning and locking unit scans the comparator circuit while the other scanning and locking circuits store previous values output from the comparator circuit.

2. A circuit arrangement as claimed in claim 1 for a television receiver of the PAL standard, further comprising a PAL decoder to obtain color difference signals having a first input coupled to the first input of the phase comparator circuit to receive a color type signal and a second input coupled to the output of the oscillator, the scanning and locking units being two in number.

3. A circuit arrangement as claimed in claim 1, for an image recording and playback instrument (video recorder), further comprising a modulator to modulate a color signal from a first to a second carrier by means of a third carrier, the modulator having a first input to receive the color signal, a second input to receive the third carrier and an output which is coupled to the first input of the phase comparator circuit, a phase stepping circuit coupled between the voltage-controlled oscillator and the phase comparator circuit to restore the original phase relationship of the second carrier and to eliminate a phase shift made on recording at the first carrier, and a mixer to generate the third carrier, the mixer having a first and a second input coupled to an output of the phase stepping circuit and a reference oscillator, respectively.

4. A circuit arrangement as claimed in claim 3, for a video recorder of the PAL standard, wherein there are at least four scanning and locking units.

* * * * *